June 11, 1929.   H. J. MURPHY   1,717,167
LUBRICATING APPARATUS
Original Filed March 14, 1922
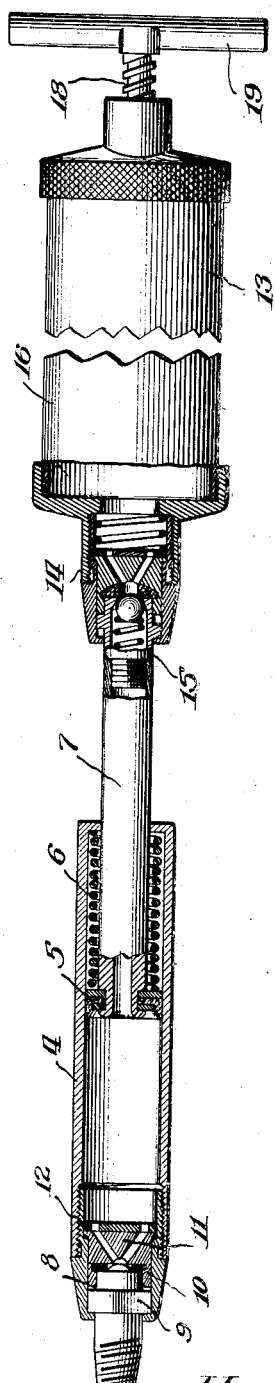
Inventor
Howard J. Murphy
By Williams, Bradbury, McCaleb &
Hinkle Attys.

Patented June 11, 1929.

1,717,167

UNITED STATES PATENT OFFICE.

HOWARD J. MURPHY, OF READING, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Original application filed March 14, 1922, Serial No. 543,646. Divided and this application filed June 20, 1928. Serial No. 286,986.

This invention pertains to improvements in lubricating apparatus, and more particularly to lubricating apparatus of the type in which the lubricant is delivered under pressure to the part to be lubricated. It is among the objects of the invention to provide to lubricant expelling device of superior convenience in operation.

Referring to the drawing, the single figure is a side elevation of a preferred form of my invention, being partly in section.

Referring to the drawing, showing a preferred form of my invention selected for illustrative purposes, I have shown a lubricant expelling device including a cylinder 4 from which lubricant may be expelled by a piston 5 which may be solely actuated by the spring 6 or by a combination of the spring 6 with a thrust exerted on the tubular stem 7. As the piston 5 is moved toward the left, as viewed in the drawing, pressure is exerted on the lubricant within the cylinder 4 tending to expel it from the nozzle 8 of the expelling device. The preferred form of nozzle illustrated includes a coupling of the type illustrated in co-pending application, Serial No. 543,643, filed March 14, 1922, now Patent No. 1,661,904, issued March 6, 1928, adapted to engage the lubricant receiving nipple 9 of the type illustrated in said co-pending application. The nozzle may include the sealing disc 10 and rotary valve mechanism 11, 12 similar to that illustrated in the co-pending application above referred to.

In the preferred form of my invention illustrated, a charging device 13 is provided for loading the lubricant expelling device, this charging device preferably being provided with a nozzle 14 including a valved coupling similar to that herein previously described and adapted to engage over a lubricant receiving nipple 15 preferably similar to the lubricant receiving nipple 9 but mounted at the end of the tubular stem 7. The charging means preferably takes the form of a second lubricant expelling device very considerably larger than the lubricant expelling device first described. This charging device may be used either to force lubricant into the lubricant expelling device having the cylinder 4, through the hollow stem 7 thereof, or for coupling direct to nipples on the more accessible part to be lubricated, the smaller lubricant expelling device being reserved, if desired, for use on the more inaccessible nipples, while the second lubricant expelling device may include a barrel 16 having a piston reciprocable therein (not shown) and a screwthreaded stem 18 adapted to press against the piston in grease expelling direction.

My invention is particularly adapted for use as a unitary apparatus for supplying lubricant to nipples under both high and extremely high pressure. In so using my invention the apparatus is connected as illustrated in the drawing and the handle 19 on the screwthreaded stem 18 is operated to force grease from the charging device 13 into the cylinder 4 and from thence into the nipple 9 attached to the bearing to be lubricated. In case the bearing is clogged with dirt or old lubricant or for any other reason offers high resistance to the flow of lubricant therethrough, the lubricant discharged by the charging device 13 will not pass into the bearing but will fill the cylinder 4, pushing the piston 5 rearwardly therein, or to the right as shown in the figure, thereby compressing the spring 6. When the cylinder 4 is full of lubricant, the operator presses the handle 19 of the charging device 13 toward the nipple 9 attached to the bearing to be lubricated, thereby increasing the pressure on the lubricant in the barrel 4 and forcing this lubricant into the bearing at materially increased pressure. In this connection it should be noted that any thrust exerted on the piston 5 through the tubular stem 7 is in addition to the force exerted by the spring 6 and serves to increase the pressure in the cylinder 4 over that exerted by the charging device 13 in filling said cylinder.

This application is a division of my co-pending application, Serial No. 543,646, filed March 14, 1922.

While I have shown and described a preferred form of one embodiment of my invention, it will be understood that changes involving omissions, substitutions, alterations and reversal of parts, and even changes in the mode of operation, may be made without departing from the scope of my invention, which is best defined in the following claims.

I claim:

1. Lubricating apparatus comprising, in combination, a portable lubricant expelling device, charging means for said device including a second lubricant expelling device, coupling means for securing said devices together during the charging operation, said first named expelling device including a piston and a hollow piston rod through which lubricant is received from said second named expelling device, high pressure spring means urging said piston in lubricant expelling direction, and a valved coupling at the discharge end of said second expelling device.

2. Lubricating apparatus of the class described comprising, in combination, relatively low pressure compressing means, relatively high pressure compressing means supplied therefrom, resilient means in said high pressure compressing means tending to expel lubricant therefrom, and means whereby manual pressure may be exerted on said low pressure compressing means to increase the pressure on the lubricant in said high pressure compressing means beyond that exerted by said resilient means.

3. High pressure lubricating apparatus of the class described comprising, in combination, relatively low pressure compressing means, portable, relatively high pressure compressing means supplied therefrom, a quick detachable discharge coupling for connecting said high pressure compressing means with a bearing to be lubricated, resilient means in said high pressure compressing means, said resilient means tending to force lubricant to said bearing and energized by the filling of said high pressure compressing means from said low pressure compressing means, and a handle part whereby a direct manual thrust may be applied to said high pressure compressing means to discharge lubricant therefrom at a pressure greater than that exerted by said low pressure compressing means.

4. Lubricating apparatus of the class described comprising, in combination, a barrel, a piston therein for discharging lubricant therefrom, a handle rotatable to advance said piston, a cylinder having a supply connection with said barrel, a piston in said cylinder, resilient means for operating said piston in lubricant discharging direction, said resilient means energized by the filling of said cylinder with lubricant, a discharge coupling for said cylinder, and means connecting said cylinder with said barrel whereby a manual thrust exerted on said handle serves to increase the pressure on the lubricant in said cylinder.

5. In high pressure lubricating apparatus of the class described, the combination of a relatively low pressure cylinder, means for expelling lubricant therefrom, a relatively high pressure cylinder connected to said low pressure cylinder and supplied therefrom, expelling means in said high pressure cylinder, means for connecting said high pressure cylinder with a part to be lubricated, a handle for operating both of said expelling means, and resilient means tending to operate one of said expelling means.

6. In lubricating apparatus of the class described, the combination of a relatively low pressure cylinder, expelling means therefor, a relatively high pressure cylinder communicating with said low pressure cylinder and supplied therefrom, expelling means in said high pressure cylinder, a spring tending to operate said last named expelling means, coupling means for connecting said high pressure cylinder with a part to be lubricated, and a handle operable in one direction to actuate said low pressure expelling means and operable in a second direction to actuate said high pressure expelling means.

7. High pressure lubricating apparatus of the class described comprising, in combination, a relatively low pressure cylinder, expelling means therein, a quick detachable coupler carried by said cylinder, a portable, relatively high pressure cylinder, a spring pressed piston therein, a tubular piston rod detachably engaging said coupler and serving as a supply conduit for said high pressure cylinder, a second quick detachable coupler carried by said high pressure cylinder for establishing a connection with a part to be lubricated, and a handle for applying force to said expelling means and said piston.

8. In high pressure lubricating apparatus of the class described, the combination of a relatively low pressure cylinder, a screw operated piston therein, a quick detachable coupler carried by said cylinder, a portable, relatively high pressure cylinder supplied from said low pressure cylinder, a quick detachable coupler carried by said high pressure cylinder for connecting said cylinder with a part to be lubricated, a piston in said high pressure cylinder, a spring for biasing said piston in one direction, a tubular piston rod for said high pressure piston having a part engageable in said first named coupler, a check valve located in said piston rod for preventing the high pressure created in said high pressure cylinder from being exerted on said low pressure cylinder, and handle means for operating said pistons.

In witness whereof, I hereunto subscribe my name this 14th day of June, 1928.

HOWARD J. MURPHY.